United States Patent Office 3,472,795
Patented Oct. 14, 1969

3,472,795
POLYMERIZATION PROCESS
Frederick R. Tittmann, Plainfield, N.J., and Michael M. Goldin, New York, N.Y., assignors to Union Carbide Corporation, a corporation of New York
No Drawing. Filed Mar. 10, 1967, Ser. No. 622,031
Int. Cl. C08g *33/00, 53/14*
U.S. Cl. 260—2                         7 Claims

ABSTRACT OF THE DISCLOSURE

Process for the pyrolytic conversion of cyclic di-p-xylylenes to p-xylylene polymers wherein the pyrolysis vapors are transferred to a predeposition cooling zone prior to polymerization to remove the less volatile constituents in the pyrolysis vapors thereby obtaining polymers of high purity and uniform thickness.

BACKGROUND OF THE INVENTION

Field of the invention

This invention relates to an improved vapor phase polymerization process. More particularly, this invention relates to an improved process for the preparation of p-xylylene polymers.

Description of the prior art p-Xylylene polymers form a commercially interesting family of polymers due to their overall electrical, physical and barrier properties which are maintained even at ultrathin film thicknesses. Recently, ultrathin films of p-xylylene polymers have become increasingly important especially in pellicle applications, for example, polarizers, thermistors, optical beam splitters, radiation detectors, and the like. For such applications, high quality films of uniform film thickness in thicknesses below about 2 microns are required.

p-Xylylene polymers have heretofore been prepared by several polymerization techniques; however, the most commercially significant of these techniques involves the vapor phase pyrolysis of the cyclic dimer, di-p-xylylene, which is thermally cleaved to the p-xylylene monomer which is subsequently condensed on a cool surface as a p-xylylene polymer. A more detailed discussion of the polymerization process can be found in copending application Ser. No. 528,413, filed Feb. 18, 1966, now U.S. Patent No. 3,342,754, issued Sept. 19, 1967, entitled "Para-Xylylene Polymers" which is incorporated herein by reference.

Cyclic di-p-xylylenes are converted to p-xylylene polymers by vaporizing the stable, crystalline cyclic dimer under subatmospheric pressures at about 100° C. to 300° C. to produce vapors of the cyclic dimer. The resulting vapors are pyrolyzed at about 400° to 750° C. to form p-xylylene diradicals, the reactive monomer. Finally, the reactive monomer is condensed and simultaneously polymerized on a relatively cool surface to form a p-xylylene polymer or copolymer.

Generally, a supply of the cyclic dimer is placed in a vaporization zone either batchwise or in a continuous manner. The resulting vapors are fed to a pyrolysis zone wherein the cyclic dimer is converted to the reactive monomer which is then passed into a deposition zone containing the substrates to be coated. Vapors which do not condense in the deposition zone are removed via a subsequent cold trap. The entire system is maintained under subatmospheric pressure.

Due to the free radical nature of the polymerization other by-products can also be formed by gas phase interaction or upon condensation, for example, 1,2-di-tolyl-ethane, stilbenes and cyclic trimer. These by-products, together with unpyrolyzed cyclic dimer form a complex multi-component mixture of gases and condensed products of widely varying composition and thermodynamic properties. These materials, when present in the resulting p-xylylene polymer, have an adverse effect on the electrical, physical and barrier properties of the polymer as well as the uniformity of the deposited film thickness.

The impurities present in the pyrolysis vapors can be substantially minimized by very careful and exacting control of pyrolysis temperature, partial pressure of the reactive monomer and residence time. Other attempts to remove these troublesome impurities from the vapor stream by known separation techniques have been found unsuitable due to the physio-chemical irreversible change involved in condensing and polymerizing the p-xylylene diradicals to p-xylylene polymer. Distillation, for example, applies generally to the separation of a liquid mixture by partial vaporization of the mixture and separate recovery of the various constituents based on boiling point differences. Sublimation or desublimation techniques rely on passing a substance directly from a solid phase to a gaseous phase and back again. Fractional crystallization basically involves a solvent-solute system. It is readily apparent that these techniques; while useful, are generally limited to nonreactive, reversible physical state changes.

SUMMARY OF THE INVENTION

Accordingly, it is an object of the present invention to provide means for preferentially removing deleterious by-products and unreacted materials from the pyrolysis vapors thereby providing greater process flexibility.

It is another object of the present invention to minimize radiant thermal degradative effects on the deposited p-xylylene polymeric film.

It is still another object of the present invention to provide p-xylylene polymers of higher purity, more uniform compositions and gauge thickness and superior electrical, physical and barrier properties.

These and other objects are accomplished by the present invention where in the pyrolytic process for the production of p-xylylene polymers from cyclic di-p-xylylenes, the improvement is provided which comprises quenching the pyrolysis vapors prior to polymerization of the reactive monomers contained therein from the temperatures maintained in the pyrolysis zone to a temperature above the condensation-polymerization temperature of the reactive monomer but below the condensation temperature of the cyclic di-p-xylylenes to substantially remove the less volatile constituents in the pyrolysis vapors, and thereafter condensing the residual pyrolysis vapors to polymerize the reactive monomers therein to form p-xylylene polymers of high purity and uniform thickness.

DESCRIPTION OF THE PREFERRED EMBODIMENTS

The present invention provides a predeposition cooling zone for continuously cooling the pyrolysis vapors upon egress from the pyrolysis zone and prior to ingress into the deposition zone to selectively remove the undesirable, less volatile constituents by condensation. Thermal protection of the resulting polymer film is also obtained. Generally, a baffled temperature regulated chamber interposed between the outlet of the pyrolysis zone and the inlet of the deposition zone can be employed as the predeposition cooling zone.

The temperature within the predeposition cooling zone is maintained above the condensation temperature of the reactive monomeric species but below the condensation temperature of the cyclic dimer and other by-product impurities. At any given pressure, each p-xylylene diradical exhibits a range of temperature above which the diradical will not condense at rapid rates. All observed condensation temperatures have been below 200° C. but vary to some degree upon the operating pressure involved. For example, as 0.1 mm. Hg the following condensation temperatures were observed above which the growth rates of the following diradical species were less than 0.25 micron per minute:

|  | ° C. |
|---|---|
| p-Xylene | 23–30 |
| Chloro-p-xylylene | 70–80 |
| n-Butyl-p-xylylene | 130–140 |
| Iodo-p-xylylene | 180–200 |

Preferably, the lowest temperature is employed which will give maximum quality commensurate with suitable product yield. Too high a temperature in the predeposition cooling zone reduces separation efficiency whereas over-cooling causes a loss in polymer yield. In general, temperatures of from about 25° to about 100° above the condensation temperature of the p-xylylene diradical species employed at the system pressure have been found satisfactory for the surface temperature of the predeposition cooling zone. For example, surface temperatures for the predeposition cooling zone of 50°–100° C. and 100°–150° C. have been found suitable for the preparation of poly-p-xylylene and poly(chloro-p-xylylene) respectively. Since the pyrolysis vapors entering the predeposition cooling zone range in temperature from about 200° C. to about 500° C., in a preferred embodiment, a closer separation and better yield are obtained by maintaining a decreasing thermal gradient along the axial dimension of said zone to provide a relatively more gradual reduction in temperature.

In another embodiment of the present invention, further reductions in unreacted cyclic dimers and formation of undesirable by-products are obtained by maintaining an increasing thermal gradient in the pyrolysis zone or employing a multi-stage pyrolysis zone wherein each stage is maintained at a progressively higher temperature. In this manner, more moderate pyrolysis temperatures can be employed. When used in conjunction with the predeposition cooling zone, substantial reductions in degradation products and unreacted dimers are obtained with consequent reduction in equipment fouling.

The predeposition cooling zone is a vacuum tight, conveniently tubular chamber with sealing members at both ends thereof for pyrolysis outlet and deposition inlet connections. Suitable baffle inserts can be mounted within the chamber or the chamber itself can be staggered or composed of a series of angled bends to substantially reduce line of sight contact. The baffles are preferably of the optical type and can be of various shapes such as, but not limited to, segmental half moons, concentric discs or cones, chevrons, orifice plates, and other similar extended surface configurations. The outer chamber walls of the zone are temperature controlled by such means as air cooling or circulating liquid in peripherally wrapped coils. Baffle temperatures are regulated by conduction although direct temperature controlled surfaces can also be employed. Temperature sensing means in the inlet and exit ends of the chamber are useful for monitoring performance. The chamber is preferably fabricated of metal for maximum thermal control although, other materials of construction can be employed. The chamber is constructed to permit facile disassembly and cleaning. Cleaning is cyclic. Polymeric and other materials can be removed either by mechanical means or more conveniently by burning off at about 400°–450° C.

In operation, the pyrolysis vapors leaving the pyrolysis zone enter the predeposition cooling zone wherein the vapors impinge on the relatively cool surfaces causing preferential condensation of the higher boiling components of the vapor stream such as unpyrolyzed dimer and degraded by-products. The cooled and scrubbed lighter diradicals then pass into the deposition zone where they condense and polymerize in high purity and uniform gauge thickness. In addition, much of the energy imparted to the vapors during pyrolysis is removed and radiant thermal degradative effects are minimized on the deposited film. In this manner, heat buildup on the substrate is significantly reduced. The reactive monomer is provided in a vapor stream having better quality, more uniform composition and temperature and providing higher deposition efficiency and film gauge uniformity than heretofore attainable. It has also been found that decreasing the temperature of the pyrolysis stream upon passage through the predeposition cooling zone provides substantially increased deposition rates of the polymer in the deposition zone.

The dimensions of the predeposition cooling zone can vary over a wide range depending on the type of polymer being employed, specific flow conditions, capacity of the unit, and completeness of separation. The chamber dimensions and baffle clearances are sufficiently large so as not to unduly impede gas flow. Since excessive back pressure causes off-products to form, increases unit load and reduces yield, allowances are preferably made for restrictions in the predeposition cooling zone caused by solids buildup or separation from cooling surfaces. The surface area within the predeposition cooling zone is sufficient to permit adequate scrubbing of the vapor stream to occur but is not excessively large so as to interfere with polymer yield. It is considered important that the loading ratio of gas throughput to surface area within the predeposition cooling zone insure a maximum reactive monomer to residual cyclic dimer and by-product ratio leaving the predeposition cooling zone. For sustained operation, the diameter of the predeposition cooling chamber preferably corresponds at least to the diameter of the pyrolysis zone. The length of the chamber is preferably at least twice the diameter of the chamber although larger or smaller chambers can be employed if desired. Predeposition cooling zones having the above dimensions have proven effective in handling dimer vaporization rates up ot about 2–4 grams per minute. The corresponding loading factor for such rates is about ¼–3 grams dimer vaporized/minute/ ft.² surface. Relatively minor polymer loss was encountered.

The following examples further illustrates the present invention but are in no way intended to limit the spirit or scope thereof.

EXAMPLES 1–3

In the following examples, samples of dichloro-di-p-xylylene were placed in a borosilicate glass vaporization chamber measuring 2″ diameter x 4″ long. The chamber was connected by a 55/50 $T_s$ joint to a 2″ diameter x 26″ long quartz pyrolysis tube. Dichloro-di-p-xylylene was vaporized at an outside temperature of 125–250° C. and a pressure of about 0.1–1 mm. Hg Abs. Vapors were passed through the 650–700° C. pyrolysis tube and through a baffled 4″ x 17″ borosilicate glass predeposition cooling chamber whose surface was maintained at 100–150° C. Thereafter, the diradicals condensed and polymerized in a 4″ diameter x 17″, room temperature, borosilicate glass, deposition chamber. Excess vapors were condensed in a Dry Ice trap. A 13 c.f.m. vacuum pump maintained about 5–10 microns Hg at its inlet port.

The following notation shall apply to all data.
P.D.C.=Predeposition cooling chamber
D.C.=Deposition chamber holder device having its surface covered with capacitors, was slowly rotated. The vapors emanating from the predeposition cooling zone impinged on the capacitors and TABLE I.—IMPROVEMENT OF POLY(CHLORO-p-XYLYLENE) PURITY WITH PREDEPOSITION COOLING

|  | Example 1 (inches into D.C.) | | | | Example 2 | | | Example 3 | | | |
| --- | --- | --- | --- | --- | --- | --- | --- | --- | --- | --- | --- |
|  | 1-2 | 3-4 | 6 | 8-10 | D.C. Inlet | D.C. Center | D.C. Outlet | P.D.C. Inlet | P.D.C. Outlet | D.C. Inlet | D.C. Outlet |
| (A) No. P.D.C. (control) [1] | 50 | 46 | 37 | 22 | | | | | | | |
| (B) 100 °C. P.D.C.[1] | | | | | 43 | 2 | 1 | 2.2 | 1.4 | 0.7 | 0.6 |
| (C) 110-120 °C.: P.D.C.[1] | 15 | 8 | 6 | 3 | | | | | | | |
| (D) 145 °C.: P.D.C.[1] | 46 | 23 | 16 | 10 | | | | | | | |
| Vaporization rate, gm./min | 0.75 | | | | 0.3 | | | 0.3 | | | |
| Pyrolysis temp., °C | 600 | | | | 550 | | | 680 | | | |

[1] Percent dimer in sample.

Unpyrolyzed dimer, being twice as heavy as the reactive monomer, preferentially condenses in the predeposition cooling chamber. This is illustrated in Table I. Samples of condensed polymers were taken at varying distances along the deposition chamber.

In Example 1 it is seen that the sample having the lowest predeposition-cooling temperature condensed most of the dimer and left the purest polymer. Raising the predeposition-cooling temperature to 145° C. increased total dimer carryover, though the condensed polymer still contained less total dimer than the control without precooling. In Example 2, the rapid deposition of dimer is strikingly evidenced.

EXAMPLES 4-5

A large amount of energy is imparted to the cyclic dimer during pyrolysis in order to break the methylene bridges therein. Predeposition cooling removes much of this energy and allows the gaseous diradicals to deposit in greater efficiency as seen in Table II. Deposition efficiency is determined as the ratio of the weight of the polymer deposited on the substrate to the weight of the cyclic dimer vaporized.

Experimental procedure was similar to that used in Examples 1-3.

TABLE II.—IMPROVEMENT IN DEPOSITION EFFICIENCY OF POLY(CHLORO-p-XYLYLENE) WITH PREDEPOSITION COOLING

|  | Ex. 4 | Control | Ex. 5 | Control |
| --- | --- | --- | --- | --- |
| Overall eff., percent | 90 | 47-53 | 92.5 | 67 |
| P.D.C. temp.,° C | 100 | None | 100 | None |
| Dimer chg., gms | 6 | 15 | 8 | 15 |
| Polymer in P.D.C., gms | 1.4 | | ≈0 | |
| Polymer in D.C., gms | 4 | 7-8 | 7.4 | 10 |
| Vaporization rate, gms./min | 0.3 | 0.12 | 0.3 | 0.65 |
| Pyrolysis temp.,° C | 680 | 680 | 550 | 580 |

EXAMPLE 6

Apparatus was assembled similar to that in Examples 1-3. Inside the deposition chamber a phenolic foam encapsulated them with polymer. The capacitors were weighed to note the polymer weight, then stripped of the coating to determine coating uniformity.

TABLE III.—IMPROVEMENT IN DEPOSITION EFFICIENCY OF POLY(CHLORO-p-XYLYLENE) WITH PREDEPOSITION COOLING

| Type of precooling | Avg. capacitor coating, wt.-gms. |
| --- | --- |
| Control ........ None | 0.0041±.0004 |
| Example 6 ..... 120-150° C. predeposition cooling | 0.0060±.0005 |

Again, utilizing predeposition cooling substantially more polymer condensed per capacitor.

EXAMPLE 7

The effect on gauge coating uniformity is shown in accompanying Table IV. The weights of the samples removed for Table I data are collated. They are indicated as a function of distance along the deposition chamber length.

TABLE IV.—IMPROVEMENT IN COOLING UNIFORMITY OF POLY-CHLORO-p-XYLYLENE) WITH PREDEPOSITION COOLING

|  | Inches into D.C. | | | | | Mean. dev., percent |
| --- | --- | --- | --- | --- | --- | --- |
|  | 1-2 | 3-4 | 6 | 8-10 | Avg. |  |
| (A) No. P.D.C. (control) Wt. of | .1726 | .1387 | .0903 | .0493 | .1127 | 38 |
| (B) 110-120° C. P.D.C., sample | .0871-.0821 | .1133 | .0986 | .0871 | .0953 | 13.2 |
| (C) 145° C.: P.D.C., gms | .1102 | .0997 | .0927 | .0788 | .0954 | 7.5 |

Without predeposition cooling, there is over a threefold increase in film thickness from the deposition chamber inlet to outlet. A substantially more uniform deposition profile is obtained with predeposition cooling.

EXAMPLE 8

Similar analysis was made on the encapsulated capacitors used for Table III data. The coatings were carefully removed and cut in two. These halves consisted of the depositions from front and rear surfaces; front faced toward the diradical feed stream while the rear faced away.

Predeposition cooling gave higher coating thicknesses and also definitely less disparity between the front and back sections.

EXAMPLES 9-16

Employing the apparatus and process described in Examples 1-3, several runs were made wherein the tem- TABLE V.—IMPROVEMENT IN COATING UNIFORMITY OF POLY-(CHLORO-p-XYLYLENE) WITH PREDEPOSITION COOLING

| Type of precooling | Avg. coating, weight-gms. | Percent within ±10% of avg. coating wt. | Ratio (front half wt.) (back half wt.) |
| --- | --- | --- | --- |
| Control ....... None | .0041 | 39 | 1.62 |
| Example 8 .... 120-150° C. predeposition cooling. | .0060 | 69 | 1.16 | perature of the predeposition cooling chamber was varied from about 390° C. to about 130° C., it can be seen from Table VI below that decreasing the temperature from 390° C. to 130° C. resulted in over a five fold increase in the deposition rate for the polymer.

TABLE VI

| Example | Deposition rate (gm./cm.²-min.) | P.D.C. temp. (° C.) |
|---|---|---|
| 9 | 0.0005 | 390 |
| 10 | 0.0004 | 380 |
| 11 | 0.0018 | 310 |
| 12 | 0.0012 | 270 |
| 13 | 0.0020 | 245 |
| 14 | 0.0023 | 210 |
| 15 | 0.0021 | 140 |
| 16 | 0.0026 | 130 |

EXAMPLE 17

To illustrate the enhanced reduction in unreacted cyclic dimer obtained through use of a thermally graded pyrolysis zone, runs were made using the apparatus and process described in Examples 1–3 with the pyrolysis zone maintained at 600° C. and comparative runs were made using essentially the same apparatus and process except that the pyrolysis zone was composed of two 2" diameter x 26" long quartz pyrolysis tubes connected in series; the first tube maintained at 400° C. and the second at 600° C. Substantial reductions in unreacted dimer were achieved in the instances wherein thermal gradient pyrolysis was employed.

EXAMPLE 18

Employing the apparatus and process described in Examples 1–3, ultrathin, self supporting membranes or pellicles of poly(p-xylylene) were formed.

In this example, the pellicles obtained were about 2000 Angstroms thick and were stretched and mounted on 3 inch diameter rings. In general, the pellicles are produced by depositing a film of poly-p-xylylene on a substrate (glass slides). The film is stripped off the substrate and mounted on suitable rings.

In this example, ten glass slides, each 4 inches by 4 inches square were thoroughly cleaned. The surface from which the poly(p-xylylene) film was to be stripped was rubbed with silicone treated optical grade lens tissue to impart a film of silicone thereto as a release agent. The slides were then placed in the deposition chamber described in Examples 1–3 and coated with poly-p-xylylene under the following conditions:

Di-p-xylylene (2.5 gms.) was vaporized at temperatures of from about 145°–160° C. over a period of about an hour. The vaporized di-p-xylylene was pyrolyzed at about 680° C. to form the reactive p-xylylene diradicals. The gaseous stream containing the reactive diradical was passed through the predeposition cooling zone maintained at about 175° C. and into the deposition zone maintained at about 200° C. The vapor pressure in said deposition zone ranged from about 40 to 125 microns.

A monitor strip of 5 mil aluminum foil placed within the deposition zone showed that the poly(p-xylylene) film on the glass substrate was about 2000 Angstroms thick. The thickness was measured by mercury pool capacitance. Removal of the film from the slides to form the pellicles was accomplished by placing three inch diameter steel rings smeared with a room temperature vulcanizing silicone rubber adhesive on the coated slides. After curing, the rings adhered to the coated slides. The ring-coated slide composites were placed under warm water to strip the poly(p-xylylene) film from the glass slides resulting in a very thin membrane of poly(p-xylylene) stretched across the rings.

Following the above steps, the mounted pellicles can be stretched over optically flat ground rings or rings of other special design to obtain various electrical or optical components.

Employing the present invention, p-xylylene polymer films of high purity and uniform gauge thickness have been obtained. These high quality films are especially useful as ultra thin pellicles which have found applications as beam splitters in optical instruments, as windows for nuclear radiation measuring devices, as panels for micrometeorite detection instruments, as dielectric supports for planar capacitors, and for extremely fast responding, low mass thermistors and thermocouples. In addition, the present invention provides greater process flexibility substantially eliminating the close tolerances heretofore required in operating temperatures, pressures and residence times to secure a minimization of by-product formation.

What is claimed is:

1. In a process for the preparation of p-xylene polymers by the pyrolysis of cyclic di-p-xylenes, the improvement which comprises quenching the pyrolysis vapors in a predeposition cooling zone prior to polymerization of the reactive monomers containing therein from the temperatures maintained in the pyrolysis zone to a temperature above the condensation temperature of the reactive monomer but below the condensation temperature of the cyclic di-p-xylene substantially removing the less volatile constituents in the pyrolysis vapors, and thereafter condensing in a separate zone the residual pyrolysis vapors to polymerize the reactive monomers therein to form p-xylylene polymers of high purity and uniform gauge thickness.

2. In the process defined in claim 1, the improvement which comprises maintaining the temperature within the predeposition cooling zone at from about 25° to about 100° above the condensation temperature of the reactive monomeric species employed at the system pressure.

3. In the process defined in claim 1, the improvement which comprises maintaining a decreasing thermal gradient along the axis of the predeposition cooling zone.

4. In the process defined in claim 3, the improvement which comprises decreasing the temperature of the pyrolysis stream within the predeposition cooling zone from about 200° to 500° C. to about 25° to about 100° above the condensation temperature of the reactive monomeric species employed.

5. In the process defined in claim 1, the improvement which comprises maintaining an increasing thermal gradient along the axis of the pyrolysis zone.

6. Process for the preparation of p-xylylene polymeric pellicles in high purity and uniform gauge thickness which comprises pyrolyzing cyclic di-p-xylylene at temperatures of from about 400° to about 750° C. at subatmospheric pressures, forming the reactive monomeric p-xylylene diradicals, passing the pyrolysis vapors into a predeposition cooling zone, quenching the pyrolysis vapors in said zone to a temperature above the condensation temperature of the reactive monomer but below the condensation temperature of the cyclic di-p-xylylene substantially removing the less volatile constituents in the pyrolysis vapors, condensing the residual pyrolysis vapors in a separate condensation zone to polymerize the reactive monomers therein forming p-xylylene polymeric films of high purity and uniform gauge thickness, and thereafter stripping said films from said condensation zone to obtain ultrathin p-xylylene polymeric pellicles.

7. Process as defined in claim 6 wherein the p-xylylene polymeric films are deposited in the condensation zone in uniform thickness less than about 2 microns.

References Cited

UNITED STATES PATENTS 3,246,627 4/1966 Loeb et al. _____ 260—2
3,342,754 9/1967 Gorham _____ 260—2

SAMUEL H. BLEECH, Primary Examiner

U.S. Cl. X.R.

117—106